US011187177B2

(12) United States Patent
Renner

(10) Patent No.: US 11,187,177 B2
(45) Date of Patent: Nov. 30, 2021

(54) METHOD AND DEVICE FOR DETECTING AND CHARACTERIZING FUEL LEAKAGE, AND VEHICLE

(71) Applicant: Bayerische Motoren Werke Aktiengesellschaft, Munich (DE)

(72) Inventor: Stephan Renner, Munich (DE)

(73) Assignee: Bayerische Motoren Werke Aktiengesellchaft, Munich (DE)

( * ) Notice: Subject to any disclaimer, the term of this patent is extended or adjusted under 35 U.S.C. 154(b) by 342 days.

(21) Appl. No.: 16/509,624

(22) Filed: Jul. 12, 2019

(65) Prior Publication Data
US 2019/0338719 A1 Nov. 7, 2019

Related U.S. Application Data

(63) Continuation of application No. PCT/EP2017/083271, filed on Dec. 18, 2017.

(30) Foreign Application Priority Data

Jan. 13, 2017 (DE) ...................... 10 2017 200 482.7

(51) Int. Cl.
*F02D 41/22* (2006.01)
*G01M 3/26* (2006.01)
(Continued)

(52) U.S. Cl.
CPC .......... *F02D 41/22* (2013.01); *F02M 65/006* (2013.01); *G01M 3/26* (2013.01); *G01M 15/09* (2013.01);
(Continued)

(58) Field of Classification Search
CPC ............... F02D 41/22; F02D 2041/225; F02D 2200/0606; F02M 65/006; G01M 3/26; G01M 15/09
(Continued)

(56) References Cited

U.S. PATENT DOCUMENTS 5,797,374 A * 8/1998 Minagawa ............ F02D 41/042
123/198 DB
10,513,998 B1 * 12/2019 Uhrich ................... F02M 37/10
(Continued)

FOREIGN PATENT DOCUMENTS

CN 103635677 A 3/2014
CN 105020076 A 11/2015
(Continued)

OTHER PUBLICATIONS

Chinese-language Office Action issued in Chinese Application No. 201780082888.X dated Jun. 3, 2021 with English translation (20 pages).
(Continued)

*Primary Examiner* — Mahmoud Gimie
(74) *Attorney, Agent, or Firm* — Crowell & Moring LLP

(57) ABSTRACT

A method and a device detect and characterize fuel leakage in an injection system of an internal combustion. The injection system has an injection device for injecting fuel into a combustion chamber of the internal combustion engine, a closable high-pressure branch for supplying the injection device with fuel placed under a first fuel pressure, and a closable low-pressure branch for feeding fuel placed under a second, lower fuel pressure from a fuel supply to the high-pressure branch. The high-pressure branch and the low-pressure branch are each closed, wherein in the high-branch branch and in the low-pressure branch an associated curve of fuel pressure over time is sensed at the same time during a measurement time period. On the basis of the sensed curve of fuel pressure of the high-pressure branch, it is checked whether fuel loss occurred in the closed-off high-pressure branch during the measurement time period. By way of the sensed curve of fuel pressure of the low-pressure branch, it is checked whether a flow of fuel into the closed-off low-pressure branch occurred during the mea-
(Continued)

surement time period. If the existence of fuel loss was determined in the first checking step and additionally it was determined in the second checking step that no flow of fuel into the low-pressure branch occurred, a signal is output, which indicates fuel leakage from the high-pressure branch into the combustion chamber.

16 Claims, 2 Drawing Sheets

(51) Int. Cl.
  *G01M 15/09* (2006.01)
  *F02M 65/00* (2006.01)
(52) U.S. Cl.
  CPC .................. *F02D 2041/225* (2013.01); *F02D 2200/0602* (2013.01)
(58) Field of Classification Search
  USPC ...................................................... 73/40.5 R
  See application file for complete search history.

(56) References Cited

U.S. PATENT DOCUMENTS

| | | | |
|---|---|---|---|
| 2001/0025626 | A1 | 10/2001 | Antonioli et al. |
| 2001/0032628 | A1 | 10/2001 | Goto et al. |
| 2002/0112528 | A1 | 8/2002 | Antonioli et al. |
| 2003/0084871 | A1* | 5/2003 | Uchiyama ............. F02D 41/221 123/339.15 |
| 2005/0235964 | A1* | 10/2005 | Shibata ............... F02D 41/3809 123/458 |
| 2008/0264157 | A1 | 10/2008 | Degler et al. |
| 2009/0199627 | A1 | 8/2009 | Bossemeyer et al. |
| 2009/0260601 | A1 | 10/2009 | Ulrey et al. |
| 2013/0013174 | A1 | 1/2013 | Nistler et al. |
| 2013/0019670 | A1* | 1/2013 | Jung ..................... F02D 41/221 73/114.51 |
| 2014/0123950 | A1 | 5/2014 | Doelker |
| 2014/0142832 | A1 | 5/2014 | Pursifull |
| 2018/0010542 | A1 | 1/2018 | Doelker |

FOREIGN PATENT DOCUMENTS

| | | |
|---|---|---|
| DE | 601 09 966 T2 | 3/2006 |
| DE | 10 2004 055 575 A1 | 5/2006 |
| DE | 601 17 090 T2 | 11/2006 |
| DE | 10 2005 043 971 A1 | 3/2007 |
| DE | 10 2007 052 451 A1 | 5/2009 |
| DE | 10 2009 007 353 A1 | 10/2009 |
| DE | 10 2011 102 282 A1 | 11/2012 |
| DE | 11 2012 002 851 T5 | 4/2014 |
| DE | 10 2013 200 554 A1 | 7/2014 |
| DE | 10 2015 206 303 A1 | 10/2016 |
| DE | 10 2015 206 912 A1 | 10/2016 |
| WO | WO 2016/173689 A1 | 11/2016 |

OTHER PUBLICATIONS

International Search Report (PCT/ISA/220 & PCT/ISA/210) issued in PCT Application No. PCT/EP2017/083271 dated Apr. 4, 2018 with English translation (nine pages).
German-language Written Opinion (PCT/ISA/237) issued in PCT Application No. PCT/EP2017/083271 dated Apr. 4, 2018 (seven pages).
German-language Search Report issued in counterpart German Application No. 10 2017 200 482.7 dated Jan. 2, 2018 with partial English translation (11 pages).
German-language Office Action issued in counterpart German Application No. 10 2017 200 482.7 dated Jun. 14, 2018 (nine pages).
German-language Office Action issued in German Application No. 10 2017 200 482.7 dated Jun. 10, 2021 (10 pages).

\* cited by examiner

METHOD AND DEVICE FOR DETECTING AND CHARACTERIZING FUEL LEAKAGE, AND VEHICLE

CROSS REFERENCE TO RELATED APPLICATIONS

This application is a continuation of PCT International Application No. PCT/EP2017/083271, filed Dec. 18, 2017, which claims priority under 35 U.S.C. § 119 from German Patent Application No. 10 2017 200 482.7, filed Jan. 13, 2017, the entire disclosures of which are herein expressly incorporated by reference.

BACKGROUND AND SUMMARY OF THE INVENTION

The invention relates to a method and a device for detecting and characterizing fuel leakages in an injection system of an internal-combustion engine, and also to a vehicle with such a device.

Known from automotive engineering are internal-combustion engines in which fuel is injected at high pressure by injection devices into one or more combustion chambers of the internal-combustion engine, in order to increase the efficiency of the combustion process and also to reduce the exhaust emissions generated in the course of burning the fuel. In this case, the high pressure of the fuel is ordinarily made available centrally in a manifold (common rail) by a high-pressure pump. The high-pressure pump draws the fuel from a fuel supply line in which the fuel is under lower pressure than in the manifold.

In such internal-combustion engines the imperviousness of the injection devices is of great significance, since a fuel leakage from the manifold into the combustion chamber(s) of the internal-combustion engine after the internal-combustion engine has been switched off is to be avoided. In the course of a subsequent restart of the internal-combustion engine an uncontrolled penetration of fuel into the combustion chamber(s) may lead to an incomplete or dirty combustion of the fuel that has penetrated, and consequently to elevated exhaust emissions which, in particular, may have been increased in comparison with the exhaust emissions in the course of normal operation of the internal-combustion engine.

DE 10 2013 200 554 A1 discloses a method for calculating the leakage of a common-rail system of an internal-combustion engine by capturing at least two pressure values after a request for a stop of the internal-combustion engine and by calculating an approximation curve for the pressure profile on the basis of at least two captured pressure values. By an appropriate raising or lowering of a rail pressure after a request for a stop, a uniform start/stop operating behavior can be guaranteed.

DE 11 2012 002 851 T5 discloses a method for controlling a system with an engine during an idling state of the engine, and teaches a shutdown of the fuel injection and the setting of an impairment condition as a reaction to the fact that a rate of decrease of a fuel pressure in the common fuel manifold after a first defined period is greater than a decrease threshold. In this case, escaping fuel can be detected with high resolution, so that fuel leaks are detected before they cause major problems.

However, by means of these methods known from the prior art it cannot be detected whether the leakage is taking place into a combustion chamber of the internal-combustion engine.

It is an object of the invention to improve the detection of leakage in a high-pressure branch of an internal-combustion engine, in particular to characterize it more accurately.

A first aspect of the invention relates to a method for detecting and characterizing a fuel leakage in an injection system of an internal-combustion engine that exhibits: an injection device for injecting fuel into a combustion chamber of the internal-combustion engine, a closable high-pressure branch for supplying the injection device with fuel under a first fuel pressure, and a closable low-pressure branch for supplying fuel under a second, lower fuel pressure to the high-pressure branch from a fuel supply. In a capture step, the high-pressure branch and the low-pressure branch have each been closed, and in the high-pressure branch and in the low-pressure branch in each instance an associated temporal fuel-pressure profile is captured during a measuring period by way of sensors at the same time, in particular continuously. In a first checking step, it is checked, on the basis of the captured fuel-pressure profile of the high-pressure branch, whether a loss of fuel in the sealed high-pressure branch has arisen in the measuring period, and in a second checking step it is checked, on the basis of the detected fuel-pressure profile of the low-pressure branch, whether an influx of fuel into the sealed low-pressure branch has occurred in the measuring period. In addition, in an output step, in the event that the existence of a loss of fuel was established in the first checking step and it was additionally established in the second checking step that no influx of fuel into the low-pressure branch has occurred, a signal is output that indicates a fuel leakage running from the high-pressure branch into the combustion chamber.

In the sense of the invention a "high-pressure branch" is to be understood as meaning a region of an injection system in which fuel is being conducted at a higher pressure in comparison with the associated low-pressure branch. This region may have been formed, for instance, from high-pressure lines, in particular from a central manifold or several manifolds (common rail). The high-pressure branch has preferably been designed for a fuel pressure within the range from about 50 bar to 350 bar, for instance 200 bar. The high-pressure branch is preferentially delimited by a high-pressure pump in relation to other regions in which fuel is being conducted at a lower pressure, in particular in relation to a low-pressure branch.

In the sense of the invention a "low-pressure branch" is to be understood as meaning, accordingly, a region of an injection system in which fuel is being conducted at a lower pressure in comparison with the associated high-pressure branch. This region may have been formed, for instance, from low-pressure lines, in particular from connecting lines between a fuel supply, for instance a fuel tank, and a high-pressure branch. The low-pressure branch has preferably been designed for a fuel pressure within the range of 50 bar or below, for instance from 2 bar to 10 bar. The low-pressure branch is preferentially delimited by a high-pressure pump in relation to other regions in which fuel is being conducted at a higher pressure, in particular in relation to the high-pressure branch, and/or by a low-pressure pump in relation to other regions in which fuel is being conducted at a lower pressure, for instance in relation to a fuel supply.

In the sense of the invention "closable" is to be understood as meaning, in particular, a separation of one branch in an injection system from other branches of the injection system. The separation preferentially relates to a separation of one or more fluid-conducting connections between the branch and other branches. A closed branch, in particular, a closed high-pressure or low-pressure branch, accordingly receives the amount of a substance located in it, in particular the volume of fuel located in it, at least as long as no leakage from the closed branch arises. At constant temperature, the pressure of the substance, in particular fuel, located in the closed branch correspondingly also remains substantially constant. The closure of a branch can preferentially be obtained by an appropriate control, in particular a deactivation, of pumps, for instance of a high-pressure and/or low-pressure pump, and/or by one or more valves, for instance check valves, and/or injection devices.

By virtue of the method, it can be established particularly easily whether a fuel leakage occurring in the high-pressure branch is leaking into the combustion chamber via injection devices or is leaking into the low-pressure branch, in particular via a pump which has been set up to make fuel available in the high-pressure branch at the first fuel pressure by transfer from the low-pressure branch.

It is of particular advantage that the method can be implemented easily and without great technical effort in almost all vehicles, in particular newer vehicles, with direct injection, since the pressures in a low-pressure branch and in a high-pressure branch of injection systems of the internal-combustion engines of such vehicles are ordinarily already monitored by suitable sensor units. In particular, as a rule no additional sensory components, which would additionally have to be integrated, are necessary in order to be able to evaluate the fuel-pressure profiles in the high-pressure and low-pressure branches in accordance with the method, in particular in order to be able to relate them to one another.

The signal subsequently generated, which indicates a fuel leakage from the high-pressure branch into a combustion chamber, is preferably written to a fault memory, transmitted to a maintenance service and/or displayed to a user, for instance as a status message on a dashboard of the vehicle. As a result, the imperviousness of a defective injection device can be restored promptly and reliably, so that the discharge of elevated exhaust emissions, at least over a lengthy period of time, can be avoided.

In a preferred realization, a beginning of the measuring period is defined by a switching-off of the internal-combustion engine. As a result, on the one hand the high-pressure and low-pressure branches can be closed without impairment of the operation of the internal-combustion engine, particularly at the beginning of the measuring period, and on the other hand a fuel leakage from the high-pressure branch into the combustion chamber of the internal-combustion engine, which would lead to elevated exhaust emissions upon a restart of the internal-combustion engine, can be detected reliably.

In another preferred realization, in the first checking step any loss of fuel is quantified on the basis of the fuel-pressure profile in the high-pressure branch, and in the second checking step any influx of fuel is quantified on the basis of the fuel-pressure profile in the low-pressure branch. The amount of fuel that has escaped from the high-pressure branch, and/or the amount of fuel that has flowed into the low-pressure branch, is/are preferentially calculated thermodynamically on the basis of the fuel pressure captured in the high-pressure branch and/or the fuel pressure captured in the low-pressure branch, in which connection the temperature of the fuel, the volume of the high-pressure branch and/or the thermal conductivity of one or more components of the high-pressure branch and/or of the low-pressure branch enter into the calculation. A signal that is output correspondingly is then preferably also characterized by the quantified loss of fuel, in particular into the combustion chamber via the injection device, and/or by the quantified influx of fuel.

As a result, it can be detected, in particular quickly and reliably, how severe the fuel leakage from the high-pressure branch is, or how severely defective—that is to say, leaky—the injection device and/or a pump arranged between the low-pressure branch and the high-pressure branch is/are, and how quickly an appropriate repair or an appropriate exchange has to take place. In particular, on the basis of the calculated amount of fuel that is escaping into the combustion chamber via the injection device the intensification of exhaust emissions caused thereby can advantageously be inferred, and also whether the corresponding internal-combustion engine may continue to be used, for instance within the framework of statutory regulations.

In another preferred realization, in the output step a signal that indicates a fuel leakage running from the high-pressure branch into the combustion chamber is output even if the quantified influx of fuel in the low-pressure branch is lower than the quantified loss of fuel in the high-pressure branch. As a result, an escape of fuel from the high-pressure branch into the combustion chamber via the injection device can be determined reliably even when the fuel is also escaping simultaneously from the high-pressure branch into the low-pressure branch, in particular via a pump.

In another preferred realization, in the first checking step a loss of fuel in the high-pressure branch is established only when the first fuel pressure in the high-pressure branch according to the associated captured fuel-pressure profile in the measuring period has reached or fallen short of a defined high-pressure threshold value. In this case, the loss of fuel at a predetermined instant within the measuring period after reaching the high-pressure threshold value is preferentially quantified by means of a difference between the captured fuel pressure in the high-pressure branch at the predetermined instant and the high-pressure threshold value. In this connection, the high-pressure threshold value is preferably time-dependent, so that the reaching or falling short of the high-pressure threshold value by the fuel-pressure profile in the high-pressure branch within the measuring period is checked substantially continuously. The quantification is then carried out appropriately on the basis of a difference between the captured fuel pressure in the high-pressure branch at the predetermined instant and the high-pressure threshold value at the predetermined instant. As a result, a loss of fuel in the high-pressure branch can be established and quantified particularly easily and reliably.

In another preferred realization, in the second checking step an influx of fuel into the low-pressure branch is established only when the second fuel pressure in the low-pressure branch according to the associated captured fuel-pressure profile in the measuring period has reached or exceeded a defined low-pressure threshold value. In this case, the influx of fuel at a predetermined instant within the measuring period after the reaching of the low-pressure threshold value is preferentially quantified by means of a difference between the captured fuel pressure in the low-pressure branch at the predetermined instant and the low-pressure threshold value. The low-pressure threshold value is preferably time-dependent, so that the reaching or falling short of the low-pressure threshold value by the fuel-pressure profile in the low-pressure branch within the measuring period can be checked substantially continuously or at least at several instants. The quantification is then carried out appropriately on the basis of a difference between the captured fuel pressure in the low-pressure branch at the predetermined instant and the low-pressure threshold value at the predetermined instant. As a result, an influx of fuel into the low-pressure branch can be established and quantified particularly easily and reliably.

In another preferred realization, in the first and/or in the second checking step a loss of fuel in the high-pressure branch or an influx of fuel into the low-pressure branch is established only when, as an additional condition, a predetermined time-interval has elapsed since the beginning of the measuring period. As a result, it can be ensured that even slight losses of fuel in the high-pressure region, or slight influxes of fuel into the low-pressure region, by virtue of which a fall in pressure in the high-pressure region or an increase in pressure in the low-pressure region becomes noticeable only after some time, can be captured.

In another preferred realization, for the purpose of performing the check occurring in the first checking step a slope, in particular a (negative) slope corresponding to a fall in pressure, of the fuel-pressure profile in the high-pressure branch is ascertained, and it is then established that a loss of fuel has arisen in the sealed high-pressure branch in the measuring period if the ascertained slope of the fuel-pressure profile in the high-pressure branch for an arbitrary instant in the measuring period is less than the slope of a reference fuel-pressure profile, indicating an absence of leakages, in the high-pressure branch at the same instant. In this connection, the absolute values of the respective slopes are preferentially ascertained and related to one another, in particular compared with one another. In this connection, an occurrence of a loss of fuel is detected if the absolute value of the ascertained slope is higher than the absolute value of the slope of the reference fuel-pressure profile. In this way, the existence of a loss of fuel in the high-pressure branch can be checked even more reliably, in particular in comparison with the check of reaching or falling short of a high-pressure threshold value.

In another preferred realization, for the purpose of performing the check occurring in the second checking step, a slope of the fuel-pressure profile in the low-pressure branch, in particular the modulus thereof, is ascertained, and it is then established that a loss of fuel has arisen in the sealed low-pressure branch in the measuring period if the ascertained slope, in particular the modulus thereof, of the fuel-pressure profile in the low-pressure branch for an arbitrary instant in the measuring period is higher than the slope, in particular the modulus thereof, of a reference fuel-pressure profile, indicating an absence of leakages, in the low-pressure branch at the same instant. As a result, the occurrence of an influx of fuel into the low-pressure branch can be checked even more reliably, in particular in comparison with the check of reaching or exceeding a low-pressure threshold value.

In another preferred realization, the method further has a reference step taking place before the capture step, in which the reference fuel-pressure profile in the high-pressure branch and/or the reference fuel-pressure profile in the low-pressure branch is/are ascertained. Alternatively or additionally, the preferentially time-dependent high-pressure threshold value and/or the preferentially time-dependent low-pressure threshold value is/are ascertained in the reference step. As a result, a loss of fuel from the high-pressure branch and/or the existence of an influx of fuel into the low-pressure branch can be checked from the beginning of the measuring period, so that the signal indicating a fuel leakage from the high-pressure branch into the combustion chamber can be output without delay. Alternatively, the reference fuel-pressure profile may also already occur by a type-dependent input of data, at the factory, into an appropriate reference memory, without a separate ascertainment of a reference fuel-pressure profile occurring for each concrete injection system of this type to be configured.

In another preferred realization, the ascertaining of the reference fuel-pressure profile in the high-pressure and/or low-pressure branch is carried out on the basis of a physical model, into which at least one of the following quantities is entered: (i) a measured fuel pressure in the high-pressure and/or low-pressure branch, (ii) an engine speed, (iii) a temperature of the internal-combustion engine, in particular of the low-pressure branch, of the high-pressure branch and/or of the combustion chamber, (iv) an arrangement and/or geometrical property of one or more components of the internal-combustion engine, and/or (v) a thermal conductivity of one or more components of the internal-combustion engine. In this connection, the measured fuel pressure in the high-pressure or low-pressure branch preferentially relates in each instance to an operating pressure, in particular the first fuel pressure and/or the second fuel pressure, during the operation of the internal-combustion engine, in particular before the beginning of the measuring period. Correspondingly, the engine speed preferentially likewise relates to an engine speed during the operation of the internal-combustion engine, in particular before the beginning of the measuring period. As a result, a pressure profile in the high-pressure and/or low-pressure branch, in particular after the internal-combustion engine has been switched off, can be predicted particularly reliably.

At least one of these and, where appropriate, further variables preferably serve as input quantities or parameters of a simulation of the pressure profiles in the high-pressure and/or low-pressure branch, on the basis of which the reference fuel-pressure profile in the high-pressure and/or low-pressure branch, on the one hand, and/or the, in particular time-dependent, high-pressure threshold value and/or the, in particular time-dependent, low-pressure threshold value, on the other hand, is/are ascertained.

In a particularly preferred realization, the ascertained reference fuel-pressure profile in the high-pressure and/or low-pressure branch is updated within the measuring period, in particular on the basis of the pressure profile in the high-pressure and/or low-pressure branch measured during the measuring period. As a result, the check as to whether a loss of fuel in the high-pressure branch and/or an influx of fuel into the low-pressure branch is/are present becomes particularly reliable, and a quantification, carried out where appropriate, of the loss of fuel and/or of the influx of fuel becomes particularly accurate in comparison with a reference fuel profile determined, in particular a single time, at the beginning of the measuring period.

A second aspect of the invention relates to a device for detecting and characterizing a fuel leakage in an injection system of an internal-combustion engine that exhibits: an injection device for injecting fuel into a combustion chamber of the internal-combustion engine, a closable high-pressure branch for supplying the injection device with fuel under a first fuel pressure, and a closable low-pressure branch for supplying fuel—under a second, lower fuel pressure—to the high-pressure branch from a fuel supply, said device having been set up to execute the method according to the first aspect of the invention.

In a preferred realization, for the high-pressure branch and the low-pressure branch in each instance a pump is provided for pressurizing the fuel located in the respective branch at the first and the second fuel pressure, respectively, said pumps having been set up, at the same time, to form, in their switched-off state, in each instance a closure for at least one of the two branches, in order to close said branch or branches. In this connection, the pumps have been preferentially set up to switch to the switched-off state when the internal-combustion engine is switched off, so that the existence of a loss of fuel in the high-pressure branch and the occurrence of an influx of fuel into the low-pressure branch can be checked reliably on the basis of the ascertained pressure profiles in the high-pressure and low-pressure branches.

A third aspect of the invention relates to an injection system for an internal-combustion engine that exhibits: an injection device for injecting fuel into a combustion chamber of the internal-combustion engine, a closable high-pressure branch for supplying the injection device with fuel under a first fuel pressure, and a closable low-pressure branch for supplying fuel under a second, lower fuel pressure to the high-pressure branch from a fuel supply. The injection system exhibits, in addition, a device for detecting and characterizing fuel leakages in the injection system, according to the second aspect of the invention.

A fourth aspect of the invention relates to a vehicle, in particular a motor vehicle, with an injection system according to the third aspect of the invention.

The features and advantages described in relation to the first aspect of the invention and the advantageous configurations thereof also apply, unless otherwise mentioned or technically nonsensical, to the further named aspects of the invention and advantageous configurations thereof, and conversely.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
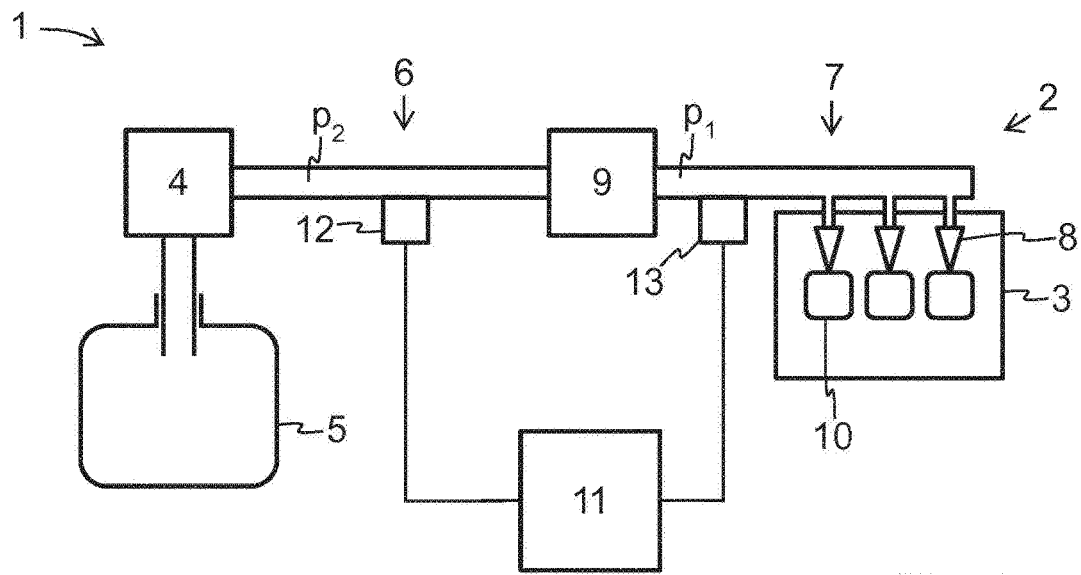
FIG. 1 is a schematic diagram of an embodiment of a device according to the invention.

FIG. 1 shows a device 1 for detecting and characterizing a fuel leakage in an injection system 2 of an internal-combustion engine 3. The injection system 2 has a low-pressure pump 4, by means of which fuel is taken from a fuel tank 5 and supplied to a low-pressure branch 6, for instance a low-pressure line, at a second fuel pressure $p_2$. The low-pressure branch 6 is adjoined by a high-pressure branch 7, for instance a high-pressure line, in particular a central manifold (common rail), which makes fuel available to several injection devices 8 at a first fuel pressure $p_1$. In this connection, the second fuel pressure $p_2$ is lower than the first fuel pressure $p_1$ which, in turn, is generated by a high-pressure pump 9 which connects the low-pressure branch 6 to the high-pressure branch 7 and pumps fuel from the low-pressure branch 6 into the high-pressure branch 7.

The fuel located in the high-pressure branch 7 is injected in an atomizing manner by the injection devices 8 into corresponding combustion chambers 10 of the internal-combustion engine 3 and is burned cleanly, with high power output.

An escape of the fuel from the high-pressure branch 7 into one of the combustion chambers 10 via at least one injection device 8 after the internal-combustion engine 3 has been switched off has an adverse effect on the exhaust emissions of the internal-combustion engine 3, in particular in the course of restarting the internal-combustion engine 3. In this connection, just a few droplets of fuel can distinctly increase exhaust emissions.

Therefore it is advantageous to detect and/or to display such a fuel leakage into the combustion chambers 10 of the internal-combustion engine 3 as early as possible, in order to be able to adopt countermeasures, or cause them to be executed, quickly and effectively, for instance by repair or replacement of defective, in particular leaky, injection devices 8.

For this purpose, the device 1 has a control unit 11 which is in communication, on the one hand, with a low-pressure sensor unit 12 and, on the other hand, with a high-pressure sensor unit 13, and has been set up to process sensor data, in particular with respect to the fuel-pressure profiles in the low-pressure branch 6 and in the high-pressure branch 7, made available by the pressure sensor units 12, 13.

For the purpose of generating these sensor data, the low-pressure sensor unit 12 has preferentially been arranged in the low-pressure branch 6 and is preferably in fluid-conducting communication with a low-pressure line of the low-pressure branch 6. The high-pressure sensor unit 13 has correspondingly preferentially been arranged in the high-pressure branch 7 and is preferably in fluid-conducting communication with a high-pressure line of the high-pressure branch 7, so that the fuel-pressure profiles, in particular the slopes thereof, in the low-pressure branch 6 and in the high-pressure branch 7 can be evaluated, preferentially related to one another, in particular compared with one another, by the control unit 11 on the basis of the sensor data generated by the pressure sensor units 12, 13.

The control unit 11 has, in particular, been set up to establish, and where appropriate to quantify, an influx of fuel into the low-pressure branch 6 on the basis of the fuel-pressure profile in the low-pressure branch 6. In particular, said control unit has also been set up to establish, and where appropriate to quantify, a fuel leakage out of the high-pressure branch 7 on the basis of the fuel-pressure profile in the high-pressure branch 7.

If the first fuel pressure $p_1$ in the high-pressure branch 7 falls more quickly or more intensely than is to be expected, for instance by reason of thermodynamic effects, after the internal-combustion engine 3 has been shut down, a fuel leakage in the high-pressure branch 7 is present. In order to determine whether fuel is escaping into the combustion chamber(s) 10 via one or more injection devices 8, or into the low-pressure branch 6 via the high-pressure pump 9, the first fuel pressure $p_1$ is related to the second fuel pressure $p_2$ in the low-pressure branch 6. If the second fuel pressure $p_2$ rises in relation to an expected fuel pressure in the low-pressure branch 6, or falls at least more slowly than is to be expected, for instance by reason of thermodynamic effects, a fuel leakage from the high-pressure branch 7 into the low-pressure branch 6, in particular via the high-pressure pump 9, can be inferred. However, if the second fuel pressure $p_2$ corresponds to an expected pressure, a leakage from the high-pressure branch 7 into the combustion chambers 10 of the internal-combustion engine 3 via the injection devices 8 can be inferred, and a corresponding signal can be output by the control unit 11.

Figure 2:
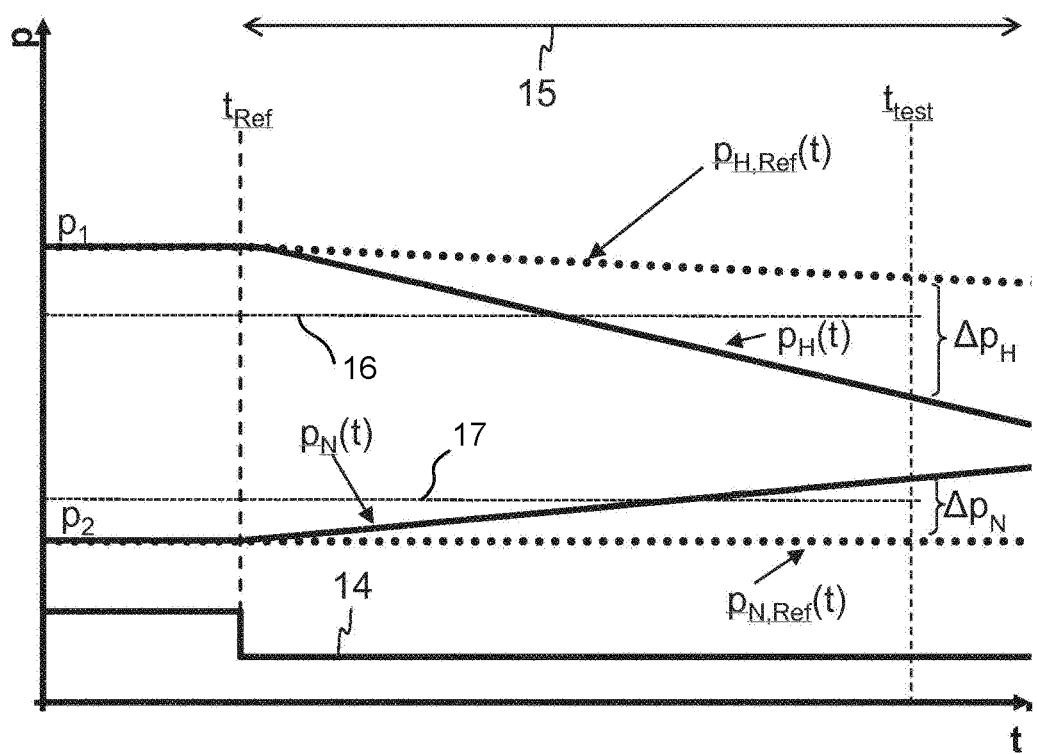
FIG. 2 is a first example of pressure profiles in a high-pressure and low-pressure branch.

In FIG. 2, a first exemplary fuel-pressure profile $p_H(t)$ in a high-pressure branch of an injection system of an internal-combustion engine and a first exemplary fuel-pressure profile $p_N(t)$ in a low-pressure branch of the injection system of the internal-combustion engine are represented. An operating state of the internal-combustion engine is indicated by the curve with the reference symbol 14. At a reference instant $t_{Ref}$ the engine is shut down and a measuring period 15 begins, so that the curve with the reference symbol 14 exhibits a corresponding step at this point.

The dotted curves represent a reference fuel-pressure profile $p_{H,Ref}(t)$ in the high-pressure branch and a reference fuel-pressure profile $p_{N,Ref}(t)$ in the low-pressure branch. The reference fuel-pressure profiles $p_{H,Ref}(t)$, $p_{N,Ref}(t)$ correspond to the profiles to be expected of the first and second fuel pressures $p_1$, $p_2$ in the high-pressure and low-pressure branches after the shutdown of the internal-combustion engine at the reference instant $t_{Ref}$, in which connection the two pumps and the injection devices then close the low-pressure branch and the high-pressure branch, respectively, in such a way that no fuel can escape from the two branches in the absence of undesirable leakages. The reference fuel-pressure profiles $p_{H,Ref}(t)$, $p_{N,Ref}(t)$ can be calculated or simulated, in particular on the basis of a physical model.

The reference fuel-pressure profile $p_{N,Ref}(t)$ in the low-pressure branch remains substantially constant after the shutdown of the internal-combustion engine at the reference instant $t_{Ref}$ and substantially corresponds to an operating pressure in the low-pressure branch in the course of operation of the internal-combustion engine.

On the other hand, the reference fuel-pressure profile $p_{H,Ref}(t)$ in the high-pressure branch falls after the reference instant $t_{Ref}$ in relation to an operating pressure in the high-pressure branch in the course of operation of the internal-combustion engine. This fall in pressure is brought about, in particular, by thermodynamic effects, for instance by a cooling of the fuel in the high-pressure branch.

In the case of a leakage from the high-pressure branch, the fuel-pressure profile $p_H(t)$ in the high-pressure branch after the reference instant $t_{Ref}$ falls more intensely than the corresponding reference fuel-pressure profile $p_{H,Ref}(t)$, this being manifested in the fact that the slope of the fuel-pressure profile $p_H(t)$ within the measuring period 15 is less than the slope of the reference fuel-pressure profile $p_{H,Ref}(t)$. In particular, the absolute value of the slope of the fuel-pressure profile $p_H(t)$ within the measuring period 15 is higher than the absolute value of the slope of the reference fuel-pressure profile $p_{H,Ref}(t)$. From this it can be inferred that there is a fuel leakage in the high-pressure branch.

On the other hand, the corresponding fuel-pressure profile $p_N(t)$ in the low-pressure branch in the present example shown in FIG. 2 rises after the reference instant $t_{Ref}$ in relation to the corresponding reference fuel-pressure profile $p_{N,Ref}(t)$, this being manifested in the fact that the slope of the fuel-pressure profile $p_N(t)$ within the measuring period 15 is higher than the slope of the reference fuel-pressure profile $p_{N,Ref}(t)$. In particular, the absolute value of the slope of the fuel-pressure profile $p_N(t)$ within the measuring period 15 is higher than the absolute value of the slope of the reference fuel-pressure profile $p_{H,Ref}(t)$. From this it can be inferred that there is an influx of fuel into the low-pressure branch.

The fuel leakage in the high-pressure branch is preferentially quantified on the basis of a difference $\Delta p_H$ between the reference fuel-pressure profile $p_{H,Ref}(t)$ and the fuel-pressure profile $p_H(t)$ at a predetermined instant $t_{test}$, for instance by the amount of escaping fuel—which causes the pressure difference $\Delta p_H$—being calculated thermodynamically. The predetermined instant $t_{test}$ may lie within the measuring period 15, as represented in the present example. But alternatively the predetermined instant $t_{test}$ may also lie at the end of the measuring period 15 (not represented). In particular, the predetermined instant $t_{test}$ may also lie after an instant at which the fuel-pressure profile $p_H(t)$ reaches or falls short of a high-pressure threshold value 16. This is particularly advantageous if a loss of fuel in the high-pressure branch is established only when the fuel-pressure profile $p_H(t)$ in the high-pressure branch reaches or falls short of the high-pressure threshold value 16.

Likewise, the influx of fuel into the low-pressure branch is preferentially quantified on the basis of the difference $\Delta p_N$ between the reference fuel-pressure profile $p_{N,Ref}(t)$ and the fuel profile $p_N(t)$ at the predetermined instant $t_{test}$, for instance by the amount of fuel flowing in, which causes the pressure difference $\Delta p_N$, being calculated thermodynamically. In particular, the predetermined instant $t_{test}$ may also in this case lie after an instant at which the fuel-pressure profile $p_N(t)$ reaches or exceeds a low-pressure threshold value 17. This is particularly advantageous if an influx of fuel into the low-pressure branch is established only when the fuel-pressure profile $p_N(t)$ into the low-pressure branch reaches or exceeds the low-pressure threshold value 17.

If the amount of fuel that has flowed away out of the high-pressure branch at the predetermined instant $t_{test}$ corresponds to the amount of fuel that has flowed into the low-pressure branch at the predetermined instant $t_{test}$, a fuel leakage out of the high-pressure branch into a combustion chamber of the internal-combustion engine via at least one injection device can be ruled out.

However, if the amount of fuel that has flowed away out of the high-pressure branch at the predetermined instant t is greater than the amount of fuel that has flowed into the low-pressure branch at the predetermined instant $t_{test}$, a fuel leakage out of the high-pressure branch into a combustion chamber of the internal-combustion engine via at least one injection device can be inferred, and a corresponding signal, which indicates the fuel leakage out of the high-pressure branch into a combustion chamber of the internal-combustion engine via the injection devices, can be output.

Figure 3:
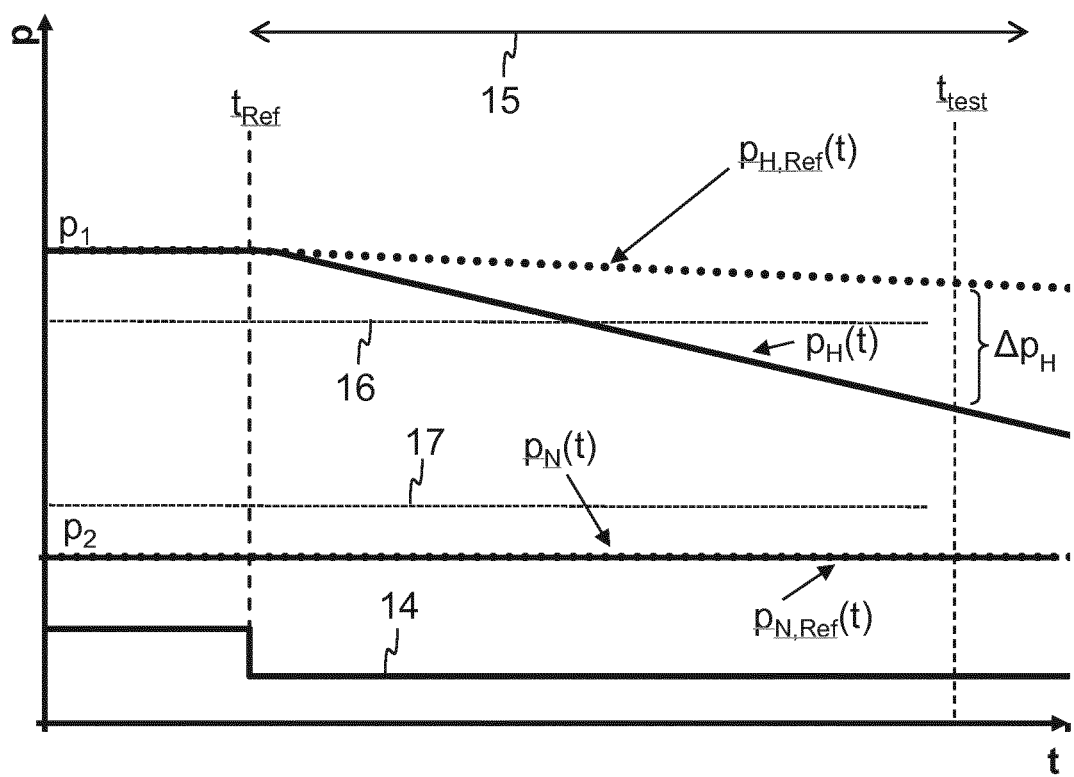
FIG. 3 is a second example of pressure profiles in a high-pressure and low-pressure branch.

FIG. 3 shows a second exemplary fuel-pressure profile $p_H(t)$ of a fuel pressure $p_1$ in a high-pressure branch and also a second exemplary pressure profile $p_N(t)$ of a fuel pressure $p_2$ in a low-pressure branch. Analogously to the comments in FIG. 2, the fuel-pressure profile $p_H(t)$ falls more quickly than a corresponding reference fuel-pressure profile $p_{H,Ref}(t)$. Therefore, and also by reason of the fact that the fuel-pressure profile $p_H(t)$ reaches or falls short of a high-pressure threshold value 16 within the measuring period 15, a loss of fuel from the high-pressure branch can be inferred.

In contrast to the case represented in FIG. 2, however, the fuel-pressure profile $p_N(t)$ in the low-pressure branch does not rise within the measuring period 15 but proceeds in accordance with a reference fuel-pressure profile $p_{N,Ref}(t)$ in the low-pressure branch, so that the fuel-pressure profile $p_N(t)$ does not reach or exceed a low-pressure threshold value 17 within the measuring period 15. In particular, the fuel pressure $p_2$ in the low-pressure branch remains substantially constant even after a shutdown of the internal-combustion engine at the instant $t_{Ref}$ at which the high-pressure and low-pressure branches are closed.

It can correspondingly be inferred from the represented fuel-pressure profiles $p_N(t)$, $p_H(t)$ that the fuel escaping from the high-pressure branch does not enter the low-pressure branch but enters a combustion chamber of the internal-combustion engine via at least one of the injection devices. Therefore, also in the example shown in FIG. 3, a signal is output that indicates the fuel leakage out of the high-pressure branch into a combustion chamber of the internal-combustion engine via an injection devices.

LIST OF REFERENCE SYMBOLS 1 device for detecting and characterizing fuel leakage
2 injection system
3 internal-combustion engine
4 low-pressure pump
5 fuel tank
6 low-pressure branch
7 high-pressure branch
8 injection device
9 high-pressure pump
10 combustion chamber
11 control unit
12 low-pressure sensor
13 high-pressure sensor
14 operating state of an internal-combustion engine
15 measuring period
16 high-pressure threshold value
17 low-pressure threshold value
$p_1$ operating pressure in the low-pressure branch
$p_2$ operating pressure in the high-pressure branch
$t_{Ref}$ reference instant
$t_{test}$ predetermined instant
$p_{H,Ref}(t)$ reference fuel-pressure profile in the high-pressure branch
$p_H(t)$ fuel-pressure profile in the high-pressure branch
$p_{N,Ref}(t)$ reference fuel-pressure profile in the low-pressure branch
$p_N(t)$ fuel-pressure profile in the low-pressure branch The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting and characterizing fuel leakage in an injection system of an internal-combustion engine that includes an injection device for injecting fuel into a combustion chamber of the internal-combustion engine, a closable high-pressure branch for supplying the injection device with fuel under a first fuel pressure, and a closable low-pressure branch for supplying fuel under a second, lower fuel pressure to the high-pressure branch from a fuel supply, the method comprising the steps of:
   capturing at the same time in the high-pressure branch and in the low-pressure branch an associated temporal fuel-pressure profile by way of sensors during a measuring period in which the high-pressure branch and the low-pressure branch have each been closed;
   a first checking act, in which, on the basis of the captured fuel-pressure profile of the high-pressure branch, it is checked whether a loss of fuel in the sealed high-pressure branch has arisen in the measuring period;
   a second checking act, in which, on the basis of the captured fuel-pressure profile of the low-pressure branch, it is checked whether an influx of fuel into the sealed low-pressure branch has occurred in the measuring period; and
   outputting a signal that indicates a fuel leakage running from the high-pressure branch into the combustion chamber if the existence of a loss of fuel was established in the first checking act and additionally it was established in the second checking act that no influx of fuel into the low-pressure branch has occurred.

2. The method according to claim 1, wherein
in the first checking act any loss of fuel is quantified on the basis of the fuel-pressure profile in the high-pressure branch, and
in the second checking act, any influx of fuel is quantified on the basis of the fuel-pressure profile in the low-pressure branch.

3. The method according to claim 2, wherein
the signal that indicates a fuel leakage running from the high-pressure branch into the combustion chamber is output even when the quantified influx of fuel in the low-pressure branch is less than the quantified loss of fuel in the high-pressure branch.

4. The method according to claim 1, wherein
in the first checking act, a loss of fuel in the high-pressure branch is established only when the first fuel pressure in the high-pressure branch according to the associated captured fuel-pressure profile has reached or fallen short of a defined high-pressure threshold value in the measuring period.

5. The method according to claim 1, wherein
in the second checking act, an influx of fuel into the low-pressure branch is established only when the second fuel pressure in the low-pressure branch according to the associated captured fuel-pressure profile has reached or exceeded a defined low-pressure threshold value in the measuring period.

6. The method according to claim 5, wherein
in the first and/or in the second checking acts, a loss of fuel in the high-pressure branch or an influx of fuel into the low-pressure branch is established only when, as an additional condition, a predetermined time-interval has elapsed since the beginning of the measuring period.

7. The method according to claim 1, wherein
for the purpose of performing the check occurring in the first checking act, a slope of the fuel-pressure profile in the high-pressure branch is ascertained and it is then established that in the sealed high-pressure branch a loss of fuel has arisen in the measuring period if the ascertained slope of the fuel-pressure profile in the high-pressure branch for an arbitrary instant in the measuring period is less than the slope of a reference fuel-pressure profile, indicating an absence of leakages, in the high-pressure branch at the same instant.

8. The method according to claim 1, wherein
for the purpose of performing the check occurring in the second checking act, a slope of the fuel-pressure profile in the low-pressure branch is ascertained and it is then established that a loss of fuel has arisen in the sealed low-pressure branch in the measuring period if the ascertained slope of the fuel-pressure profile in the low-pressure branch for an arbitrary instant in the measuring period is higher than the slope of a reference fuel-pressure profile, indicating an absence of leakages, in the low-pressure branch at the same instant.

9. The method according to claim 7, further comprising:
a reference act, taking place before the capturing, in which the reference fuel-pressure profile in the high-pressure branch and/or the reference fuel-pressure profile in the low-pressure branch are ascertained.

10. The method according to claim 8, further comprising:
a reference act, taking place before the capturing, in which the reference fuel-pressure profile in the high-pressure branch and/or the reference fuel-pressure profile in the low-pressure branch are ascertained.

11. The method according to claim 8, wherein
the ascertaining of the reference fuel-pressure profile in the high-pressure and/or low-pressure branch is carried out on the basis of a physical model, into which at least one of the following quantities is entered:
a measured first fuel pressure in the high-pressure branch and/or a measured second fuel pressure in the low-pressure branch;
an engine speed;
a temperature of the internal-combustion engine;
an arrangement and/or geometrical property of one or more components of the internal-combustion engine; and
a thermal conductivity of one or more components of the internal-combustion engine.

12. The method according to claim 9, wherein
the ascertaining of the reference fuel-pressure profile in the high-pressure and/or low-pressure branch is carried out on the basis of a physical model, into which at least one of the following quantities is entered:
a measured first fuel pressure in the high-pressure branch and/or a measured second fuel pressure in the low-pressure branch;
an engine speed;
a temperature of the internal-combustion engine;
an arrangement and/or geometrical property of one or more components of the internal-combustion engine; and
a thermal conductivity of one or more components of the internal-combustion engine.

13. A device for detecting and characterizing a fuel leakage in an injection system of an internal-combustion engine having an injection device for injecting fuel into a combustion chamber of the internal-combustion engine, a closable high-pressure branch for supplying the injection device with fuel under a first fuel pressure, and a closable low-pressure branch for supplying fuel under a second, lower fuel pressure to the high-pressure branch from a fuel supply, wherein
said device is configured to execute the method according to claim 1.

14. The device according to claim 13, wherein
for the high-pressure branch and the low-pressure branch, in each instance a pump for pressurizing the fuel located in the respective branch at the first and the second fuel pressure, respectively, is provided, said pumps having been set up at the same time to form, respectively, a closure for at least one of the two branches in their switched-off state, in order to close said branch or branches.

15. An injection system for an internal-combustion engine, comprising:
an injection device for injecting fuel into a combustion chamber of the internal-combustion engine;
a closable high-pressure branch for supplying the injection device with fuel at a first fuel pressure;
a closable low-pressure branch for supplying fuel under a second, lower fuel pressure to the high-pressure branch from a fuel supply; and
a device for detecting and characterizing fuel leakages in the injection system, said device being configured to execute the method of claim 1.

16. A vehicle comprising an injection system according to claim 15.

* * * * *